April 2, 1940.  L. W. GREVE  2,196,068
SHOCK ABSORBER
Filed Jan. 18, 1936   2 Sheets-Sheet 1
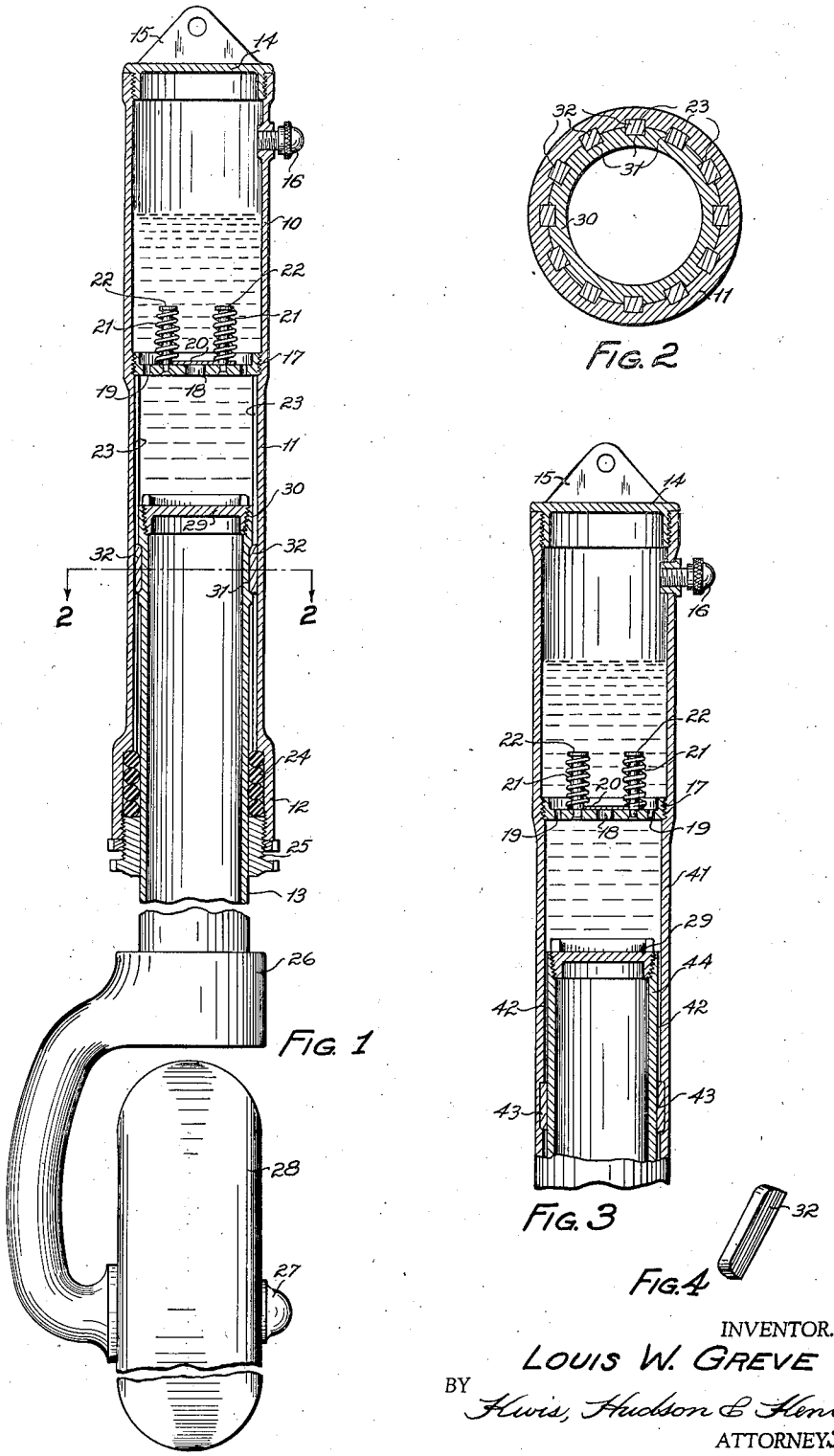
INVENTOR.
LOUIS W. GREVE
BY Hurs, Hudson & Kent
ATTORNEYS.

April 2, 1940.   L. W. GREVE   2,196,068
SHOCK ABSORBER
Filed Jan. 18, 1936   2 Sheets-Sheet 2

INVENTOR.
LOUIS W. GREVE
BY Kwis, Hudson & Kent
ATTORNEYS

Patented Apr. 2, 1940

2,196,068

UNITED STATES PATENT OFFICE 2,196,068

SHOCK ABSORBER

Louis W. Greve, Cleveland, Ohio, assignor to The Cleveland Pneumatic Tool Company, Cleveland, Ohio, a corporation of Ohio Application January 18, 1936, Serial No. 59,728

11 Claims. (Cl. 267—64)

This invention relates to improvements in shock absorbers adapted particularly for airplanes, especially shock absorbers having telescoping cylinders, where it is desired to prevent relative rotation of the cylinders. The present application is a continuation in part of my application 732,844, filed June 28, 1934.

Interfitting splines upon two telescoping cylinders have been employed heretofore or the purpose of maintaining the two cylinders always in the same angular position. The present invention is an improvement over that construction. It includes means for reducing wear in the splines and the breaking off of small particles of metal, the latter having an abrasive effect which is detrimental and tends to reduce the useful life of the shock absorber, and it also includes means for readily replacing worn splines.

Accordingly it is an object of the present invention to reduce wear upon the splines of a shock absorber of the character indicated.

Another object is the provision of a construction wherein the cost of manufacture of spline cylinders is low, and wherein replacements may be effected readily and economically.

A further object is to improve the splining of the cylinders of shock absorbers or struts of the landing gear of airplanes in a manner such that relatively short spline members may be employed on the inner cylinder of the strut and the length of the strut decreased for a given length of stroke.

Other objects and features of novelty will appear as I proceed with the description of that embodiment of the invention which, for the purposes of the present application, I have illustrated in the accompanying drawings, in which Figure 1 is an elevational view, principally in vertical section, of a shock absorber embodying the invention.

Fig. 2 is a cross sectional view taken substantially on the line 2—2 of Fig. 1, but showing the parts on a larger scale.

Fig. 3 is a vertical sectional view of a modification.

Fig. 4 is a perspective view of one of the keys employed in connection with the invention.

Figure 5:
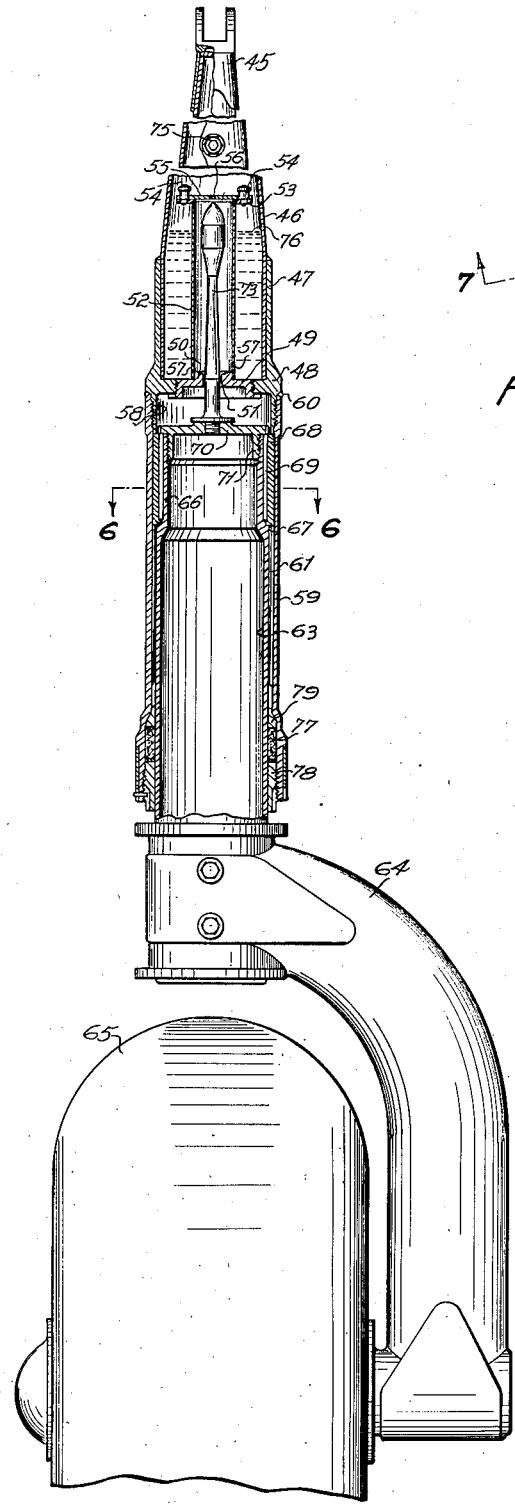
Fig. 5 is a view similar to Fig. 1 showing a different embodiment of the invention.

In Figs. 1 to 4 inclusive of the drawings I have illustrated a hydro-pneumatic shock absorber having an upper cylinder comprising upper, intermediate and lower portions 10, 11 and 12, of different diameters, and an inner lower cylinder 13. The upper cylinder is closed at the top by a threaded plug 14, and integral with this plug there is a plate or bracket 15 by means of which the upper cylinder may be attached to one of the elements whose relative movements are to be cushioned. In the upper part 10 of the larger cylinder I provide a connection and threaded cap 16. Oil and air may be introduced into the strut through this connection.

At the juncture between the parts 10 and 11 of the larger cylinder I mount a partition 17. This partition may be provided with a central port or passage 18 and a series of small ports 19 near its periphery. The central port 18 is normally closed by means of a valve plate 20. Coil springs 21 mounted on studs 22 projecting upwardly from the partition tend to hold the valve plate on its seat.

The intermediate portion 11 of the upper cylinder has spline grooves 23 extending throughout its length and spaced evenly around the cylinder. In the lower enlarged portion 12 of the upper cylinder there is mounted a fluid-tight packing 24, which may be expanded by means of a packing gland nut 25 so as to grip the lower cylinder 13 with the desired pressure.

The lower cylinder 13 carries at the bottom thereof a bracket 26 having a curved arm on the lower end of which there is a wheel spindle 27. Upon this spindle there is mounted a ground wheel 28, the bracket 26 being so shaped and proportioned that the wheel 28 stands directly underneath the cylinder 13. By virtue of this arrangement the strains placed upon the wheel tending to twist the cylinder 13 are reduced to a minimum. The cylinder 13 has a smooth exterior throughout the greater part of its length, and this smooth exterior is spaced from the grooved wall 11, as appears from Fig. 1 of the drawings.

The upper end of cylinder 13 is closed by a piston head 29 which is threaded into the cylinder 13. The skirt of the piston consists of a thickened wall portion 30 of the cylinder. This thickened wall portion is provided with a series of key slots 31, of the same number as the number of spline grooves 23. Metal keys 32 are placed in the slots 31, and run in the grooves 23, which they fit with suitable sliding clearance. The keys 32 are made of a metal that is different from that used in the manufacture of the two cylinders. The preferred material for the cylinders is steel, and the preferred material for the keys is a copper alloy, such as bronze or brass, or some other relatively soft anti-friction metal. The coefficient of sliding friction of brass or bronze upon steel is of course less than that of steel on steel, and hence the operation of the shock absorber and the useful life of the same are improved by my invention. The keys are very readily assembled in the slots 31 before the cylinders are telescoped together, and if necessary may be replaced by new ones at very small expense, which is a further advantage resulting from the invention.

Proper lubrication of the spline grooves is assured by the fact that the upper part of the strut is filled with oil, and the oil of course flows down the spline grooves 23.

It is not entirely essential that the parts be arranged in precisely the manner illustrated in Fig. 1. In fact the positions of the spline grooves and key slots may be reversed if desired. The latter arrangement is shown in Fig. 3, where the intermediate portion 41 of the upper cylinder has a smooth internal wall except for key slots 42, in which are mounted keys 43. In this modification the lower or smaller cylinder 44 has spline grooves cut therein which slidably receive the keys 43. In other respects the two constructions are alike, and they operate in substantially the same way. However, the packing in this case may be carried by the inner cylinder rather than by the outer one.

While the valve plate 20 and its operation in themselves form no part of the present invention, it may be stated that when the two cylinders telescope together upon a compression stroke oil is forced upwardly through the ports 19 of partition 17, and also through port 18, the pressure below the partition at such time raising the plate 20 against the action of springs 21. The resulting upward flow of oil at such times is, therefore, comparatively free. On the rebound stroke however the plate 20 seats itself upon the partition, closing off the port 18, so that the return flow of the oil is entirely a metered flow through the constricted openings 19, and by this means the rebound stroke is checked.

Figure 6:
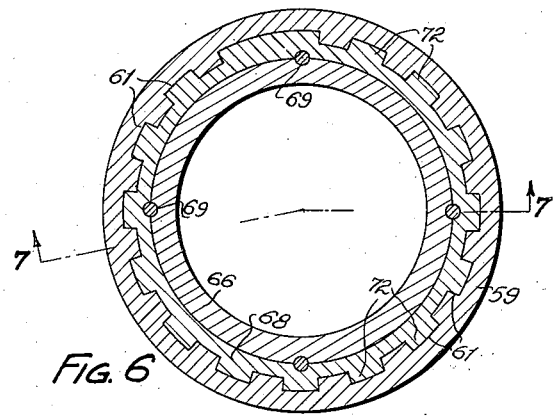
Fig. 6 is a cross sectional view on a larger scale, the view being taken substantially on the line 6—6 of Fig. 5.
Figure 7:
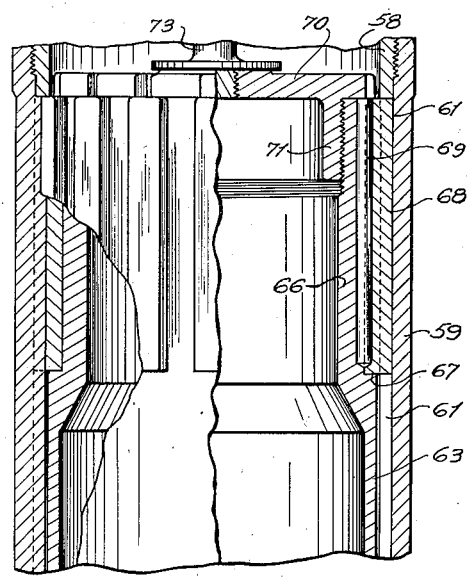
Fig. 7 is a fragmental view principally in longitudinal section taken substantially on the line 7—7 of Fig. 6.

In that form of the invention which is illustrated in Figs. 5, 6 and 7, the upper and larger cylinder is made in several parts. Of these parts the bracket 45 is adapted to be attached to a suitable part of the fuselage or wing structure of a plane. This bracket is mounted upon the upper tapered extremity of a hollow element 46 which is cylindrical at its lower end, where it fits into and is supported by a generally cylindrical part 47. This latter part near its lower end has an inwardly extending ledge 48 that is threaded to receive a threaded partition plate 49 having a central upwardly extending boss 50 with a passage 51 therethrough. Supported upon and attached to this plate 49 and boss 50 there is an upwardly extending tube 52 with a collar 53 at its upper extremity. In this collar a series of headed studs 54 are fixed. These studs form guides and retainers for a valve plate 55 which is free to move vertically on the studs and may be provided with one or more ports 56 of constricted size. Further small ports 57 are formed in the lower part of tube 52.

The cylindrical part 47 has a flange 58 extending downwardly below the ledge 48, which flange is threaded on its outer side to receive the main outer cylinder 59. When these parts are threaded up as far as they will go they may be permanently joined by a weld 60. The inner wall of cylinder 59 is provided with a series of spline grooves 61 which extend downwardly from the lower edge of flange 58 throughout the major part of the length of the cylinder.

The inner lower cylinder 63 of the shock absorber is attached to the running gear of the plane in a suitable manner. For example, there may be attached to the lower extremity of the cylinder a downwardly extending arm 64, which is so offset that it may carry a ground wheel 65 with the center of the wheel substantially aligned with the axis of the telescoping cylinders.

The upper end 66 of the inner cylinder is of slightly smaller diameter than the lower part, and an annular shoulder 67 is formed at the juncture of these two portions of different diameters. On this shoulder there is supported a sleeve 68 which closely embraces the upper end of the cylinder. The parts 66 and 68 are held against relative rotation by a series of pins 69 which are inserted into holes formed partly in the cylinder and partly in the sleeve. After the sleeve and cylinder have been assembled and locked together in this manner the upper end of the cylinder is closed by a head 70 having a depending flange 71 which is threaded into the cylinder. This head is of sufficient diameter to project outwardly beyond the joint between the cylinder and sleeve, and thereby holds the latter against endwise movement. The sleeve 68 is formed on its outer wall with splines 72 which run in the grooves 61 of the cylinder. The sleeve 68, and hence the splines 72, are made preferably of a metal or alloy different from that of cylinder 59 in which the spline grooves are formed. The cylinder 59 is usually constructed of steel, and the sleeve 68 in practice is made of bronze. When it becomes necessary to replace a sleeve 68, the head 70 is threaded out of the cylinder, after which the sleeve may be drawn off or driven off and a new one put in its place.

The parts 66 and 70 together form a piston on the upper end of cylinder 63. Extending upwardly from this piston is a metering pin 73 which is threaded into a central tapped opening in the head 70 of the piston, and projects through passage 51 in partition plate 49 into tube 52. 75 is a connection for a compressed air line which may be removed in order to provide a filling opening for oil.

When the strut is mounted upon an airplane it is first filled with oil to the height approximately of the connection 75, after which the connection 75 is replaced and the strut inflated to the desired extent, whereby the load of the plane is taken upon the compressed air in the strut, the oil level at that time, and with the plane at rest, being substantially as indicated at 76 in Fig. 5. The parts of the strut otherwise however are shown in this figure in their collapsed condition, that is before inflation of the strut.

The lower end of cylinder 59 is enlarged somewhat to receive a packing 77 and a gland nut 78 similar to the parts 24 and 25 of the first described form of the invention. Above the packing there is a metal ring 79 which can move downward somewhat under heavy pressure, thereby expanding the packing radially and causing it to more tightly engage the cylinder 63.

The operation of this form of the invention will be obvious to those skilled in the art. Upon making a landing oil is forced upwardly through passage 51 into tube 52 and out of that tube principally through the upper end thereof, the valve plate 55 then being lifted off its seat. More or less of the shock is taken also by the air in the tube of the strut. The air furthermore absorbs the smaller shocks of taxiing. Rebound is checked by the metered flow of oil through the ports 57 and the passage 51, the valve plate 55 then being down in closed position. The splines 72 running in the spline grooves 61 of course hold the two telescoping cylinders in fixed angular relation, so that the ground wheel 65 is maintained in its proper position.

As in the previously described form, the exterior surface of one cylinder 63 below the piston is a smooth cylindrical surface capable of cooperating to the fullest extent with the packing 77. By employing a considerable number of splines evenly spaced around the periphery of the piston I limit the torsional load upon any one spline. Furthermore, when wear does develop, the strut may be reconditioned by the installation of a new sleeve 68.

With both forms of the invention herein illustrated, wherein the engaging spline members are of different metals, in this instance steel and bronze, the spline members can safely withstand a greater pressure per square inch than is the case when the spline members on both cylinders are formed integral therewith, in which event there exists the condition of steel upon steel in the splined relation. By reason of this greater permissible pressure between the engaging spline members, the length of the spline ribs on the inner cylinder can be reduced, thus increasing the permissible stroke of the cylinders and making it possible to reduce the overall length of the unit for a given length of stroke. This is of great importance when the invention is utilized in struts of landing gear of airplanes where the struts are required to fold up under the plane after it has left the ground which fact renders it important that the struts be as short as possible consistent with the required length of stroke for a prescribed efficiency in shock absorption and rebound prevention.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a fluid shock absorber, inner and outer telescoping cylinders, one of said cylinders having a portion with a smooth wall and the other cylinder having a packing for engaging said smooth wall, the two cylinders having spline portions engaging each other inwardly of said packing, the spline portion of one cylinder being formed of a softer metal than the spline portion of the other cylinder.

2. In a fluid shock absorber, inner and outer telescoping cylinders, one of said cylinders having a portion with a smooth wall and the other cylinder having a packing for engaging said smooth wall, the two cylinders having interengaging spline portions, the cylinder carrying the packing having relatively extensive spline grooves, and the spline portion of the other cylinder comprising a corresponding number of removable anti-friction splines.

3. In a fluid shock absorber, inner and outer telescoping cylinders, the inner cylinder having a smooth exterior except at its inner end and the outer cylinder having a packing at its inner end engaging over said smooth exterior, the inner cylinder having individually removable and replaceable splines at its inner end, and the outer cylinder having relatively extensive spline grooves behind said packing.

4. In a fluid shock absorber, inner and outer telescoping cylinders, the inner cylinder having a portion with a smooth outer wall and the outer cylinder having a packing for engaging over said smooth wall, the two cylinders having interengaging spline portions, the spline portion of one cylinder comprising relatively extensive spline grooves, and the spline portion of the other cylinder comprising a series of removable anti-friction keys for travel in said spline grooves.

5. In a fluid shock absorber, inner and outer telescoping cylinders, one of said cylinders having a portion with a smooth wall and the other cylinder carrying a packing for engagement with said smooth wall, said two cylinders having interengaging spline portions, the spline portion of the cylinder carrying the packing comprising relatively extensive spline grooves, and the spline portion of the other cylinder comprising a corresponding number of removable anti-friction splines of relatively short length.

6. In a fluid shock absorber, inner and outer telescoping cylinders, the inner cylinder having a portion with a smooth exterior and the outer cylinder having a packing for engaging over said smooth exterior, the two cylinders having interengaging spline portions, the spline portion of one cylinder comprising relatively extensive spline grooves, and the spline portion of the other cylinder comprising a series of removable keys for travel in said spline grooves, said keys being of relatively more ductile, anti-friction metal than said grooved cylinder.

7. In a shock absorber, a pair of telescoping cylinders, one of said cylinders having an integral spline portion, and the other cylinder having a sleeve spline portion attached thereto and secured against rotation thereupon, and cooperating with said first named spline portion, said sleeve being formed of a softer metal than that of the first named cylinder.

8. In a shock absorber, a pair of telescoping cylinders, the inner cylinder having a reduced inner end, and a splined sleeve mounted upon said reduced inner end and secured against rotation, the outer cylinder having spline grooves cooperating with said splined sleeve, the splined sleeve being formed of a softer metal than the spline portion of the outer cylinder.

9. In a shock absorber, a pair of telescoping cylinders, and means for preventing relative rotation of said cylinders including two interfitting portions, one carried by one cylinder and one carried by the other, one of said portions being formed of softer metal than the other.

10. In a shock absorber, a pair of telescoping cylinders, and means for preventing relative rotation of said cylinders including two interfitting portions, one carried by one cylinder and one carried by and removably attached to the other cylinder, one of said interfitting portions being formed of softer metal than the other.

11. In a shock absorber, a pair of telescoping cylinders, and means for preventing relative rotation of said cylinders including two interfitting portions, one carried by one cylinder and one carried by and removably attached to the other cylinder, said removable interfitting portion being formed of softer metal than the other interfitting portion.

LOUIS W. GREVE.